(12) United States Patent
Ishikawa

(10) Patent No.: US 11,541,607 B2
(45) Date of Patent: Jan. 3, 2023

(54) DIELECTRIC-HEATING BONDING FILM AND BONDING METHOD USING DIELECTRIC-HEATING BONDING FILM

(71) Applicant: LINTEC CORPORATION, Tokyo (JP)

(72) Inventor: Masakazu Ishikawa, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 909 days.

(21) Appl. No.: 16/345,166

(22) PCT Filed: Oct. 18, 2017

(86) PCT No.: PCT/JP2017/037618
§ 371 (c)(1),
(2) Date: Apr. 25, 2019

(87) PCT Pub. No.: WO2018/079356
PCT Pub. Date: May 3, 2018

(65) Prior Publication Data
US 2019/0283334 A1    Sep. 19, 2019

(30) Foreign Application Priority Data

Oct. 27, 2016 (JP) .............................. JP2016-210218
Feb. 9, 2017 (JP) .............................. JP2017-021803
Feb. 9, 2017 (JP) .............................. JP2017-021806

(51) Int. Cl.
*B29C 65/04*        (2006.01)
*B29C 65/42*        (2006.01)
(Continued)

(52) U.S. Cl.
CPC .............. *B29C 65/04* (2013.01); *B29C 65/40* (2013.01); *B29C 65/425* (2013.01); *B29C 65/50* (2013.01);
(Continued)

(58) Field of Classification Search
CPC ....... B29C 65/04; B29C 65/40; B29C 65/425; B29C 65/50; C08K 3/22; C08K 3/14;
(Continued)

(56) References Cited

U.S. PATENT DOCUMENTS

2016/0032166 A1    2/2016  Zhang et al.

FOREIGN PATENT DOCUMENTS

CN    1412265 A    4/2003
CN    1820034 A    8/2006
(Continued)

OTHER PUBLICATIONS

International Search Report issued in corresponding International Patent Application No. PCT/JP2017/037618, dated Dec. 5, 2017, with English Translation.
(Continued)

*Primary Examiner* — Michael N Orlando
*Assistant Examiner* — Christopher W Raimund
(74) *Attorney, Agent, or Firm* — McDermott Will & Emery LLP

(57) ABSTRACT

A dielectric welding film capable of achieving a tight welding through a short period of dielectric heating, and a welding method using the dielectric welding film are provided. The dielectric welding film is configured to weld a pair of adherends of the same material or different materials through dielectric heating, the dielectric welding film including a thermoplastic resin as an A component and a dielectric filler as a B component and satisfying the conditions (i) and (ii):
(i) a melting point or softening point measured in accordance with JIS K 7121 (1987) is in a range from 80 to 200 degrees C.; and (ii) heat of fusion measured in accordance with JIS K 7121 (1987) is in a range from 1 to 80 J/g.

5 Claims, 2 Drawing Sheets

(51) Int. Cl.

| | | |
|---|---|---|
| B29C 65/50 | (2006.01) | |
| C08K 3/22 | (2006.01) | |
| C09J 11/04 | (2006.01) | |
| C09J 123/26 | (2006.01) | |
| C09J 129/14 | (2006.01) | |
| C09J 131/04 | (2006.01) | |
| C09J 167/00 | (2006.01) | |
| C09J 177/00 | (2006.01) | |
| H05B 6/46 | (2006.01) | |
| B29C 65/40 | (2006.01) | |
| C09J 123/00 | (2006.01) | |
| C09J 125/04 | (2006.01) | |
| H05B 6/64 | (2006.01) | |
| C09J 7/00 | (2018.01) | |
| C09J 201/00 | (2006.01) | |
| C09J 123/10 | (2006.01) | |
| C09J 7/35 | (2018.01) | |
| C09J 5/06 | (2006.01) | |
| C09J 9/00 | (2006.01) | |
| H01B 3/44 | (2006.01) | |
| H01B 17/56 | (2006.01) | |
| H05B 6/50 | (2006.01) | |
| C08K 3/14 | (2006.01) | |

(52) U.S. Cl.
CPC .................. *C08K 3/22* (2013.01); *C09J 5/06* (2013.01); *C09J 7/00* (2013.01); *C09J 7/35* (2018.01); *C09J 9/00* (2013.01); *C09J 11/04* (2013.01); *C09J 123/00* (2013.01); *C09J 123/10* (2013.01); *C09J 123/26* (2013.01); *C09J 125/04* (2013.01); *C09J 129/14* (2013.01); *C09J 131/04* (2013.01); *C09J 167/00* (2013.01); *C09J 177/00* (2013.01); *C09J 201/00* (2013.01); *H01B 3/441* (2013.01); *H01B 17/56* (2013.01); *H05B 6/46* (2013.01); *H05B 6/50* (2013.01); *H05B 6/64* (2013.01); *C08K 3/14* (2013.01); *C08K 2003/2296* (2013.01); *C08K 2201/005* (2013.01); *C09J 2203/326* (2013.01); *C09J 2301/408* (2020.08); *C09J 2301/416* (2020.08); *C09J 2423/10* (2013.01)

(58) Field of Classification Search
CPC ...... C08K 2003/2296; C08K 2201/005; C08K 2003/2237; C09J 5/06; C09J 7/00; C09J 7/35; C09J 9/00; C09J 11/04; C09J 123/00; C09J 123/10; C09J 123/26; C09J 125/04; C09J 129/14; C09J 131/04; C09J 167/00; C09J 177/00; C09J 201/00; C09J 2203/326; C09J 2301/408; C09J 2301/416; C09J 2423/10; C09J 2301/312; C09J 2301/304; C09J 2423/00; C09J 2423/106; C09J 2451/00; C09J 2467/00; C09J 7/10; C09J 123/12; H01B 3/441; H01B 17/56; H05B 6/46; H05B 6/50; H05B 6/64; B23K 13/00

See application file for complete search history.

(56) References Cited

FOREIGN PATENT DOCUMENTS

| | | | |
|---|---|---|---|
| CN | 101490146 A | 7/2009 | |
| CN | 104039873 A | 9/2014 | |
| CN | 104136197 | 11/2014 | |
| EP | 3608380 A1 | 2/2020 | |
| JP | S52-068273 A | 6/1977 | |
| JP | S54-004933 A | 1/1979 | |
| JP | S54-161645 A | 12/1979 | |
| JP | S55-59921 A | 5/1980 | |
| JP | S58-174474 A | 10/1983 | |
| JP | S61-171783 A | 8/1986 | |
| JP | S62-39221 A | 2/1987 | |
| JP | H01-294393 A | 11/1989 | |
| JP | H04-15282 A | 1/1992 | |
| JP | H08-072055 A | 3/1996 | |
| JP | H08-258173 A | 10/1996 | |
| JP | H09-67461 A | 3/1997 | |
| JP | H11-157398 A | 6/1999 | |
| JP | 2000-289113 A | 10/2000 | |
| JP | 2001-146524 A | 5/2001 | |
| JP | 2001-226533 A | 8/2001 | |
| JP | 2001-260231 A | 9/2001 | |
| JP | 2003-193009 A | 7/2003 | |
| JP | 2003193009 A | * 7/2003 | ............. B29C 66/71 |
| JP | 2003-238745 A | 8/2003 | |
| JP | 2004-181969 A | 7/2004 | |
| JP | 2008-156510 A | 7/2008 | |
| JP | 2009-126922 A | 6/2009 | |
| JP | 2009-538971 A | 11/2009 | |
| JP | 2010-006908 A | 1/2010 | |
| JP | 2013-130224 | 7/2013 | |
| JP | 2014-037489 A | 2/2014 | |
| JP | 2014037489 A | * 2/2014 | |
| JP | 2014-180808 | 9/2014 | |
| JP | 2015-151493 A | 8/2015 | |
| JP | 2015151493 A | * 8/2015 | |
| WO | 2015/109453 | 7/2015 | |

OTHER PUBLICATIONS

Notice of Reason(s) for Rejection issued in corresponding Japanese Application No. 2018-547590, dated Jul. 23, 2019, with English translation.

European Search Report issued in corresponding European Patent Application No. 17863547.0, dated Aug. 31, 2020.

Masaru Sano et al., "High-frequency welding of glass-fibre-reinforced polypropylene with a thermoplastic adhesive layer: Effects of ceramic type and long-term exposure on lap shear strength", International Journal of Adhesion & Adhesives, vol. 59, Feb. 7, 2015, pp. 7-13.

Masaru Sano et al., "High-frequency welding of glass-fiber-reinforced polypropylene with a thermoplastic adhesive layer including SiCi", International Journal of Adhesion & Adhesives, vol. 54, Jun. 2, 2014, pp. 124-130.

Chinese Office Action issued in corresponding Chinese Patent Application No. 201780066588.2, dated Dec. 22, 2020, with English translation.

Chinese Office Action issued in corresponding Chinese Patent Application No. 201780066588.2, dated Mar. 23, 2022, with English translation.

P. Wang, "Polymer Welding and its Performance Evaluation," Journal of Chongqing Institute of Technology, vol. 17 No. 4, Aug. 2003, with English abstract.

* cited by examiner

400 μm    ELECTRON MICROSCOPIC IMAGE

400 μm    ELECTRON MICROSCOPIC IMAGE

DIELECTRIC-HEATING BONDING FILM AND BONDING METHOD USING DIELECTRIC-HEATING BONDING FILM

CROSS REFERENCE

This application is the U.S. National Phase under 35 U.S.C. § 371 of International Application No. PCT/JP2017/037618, filed on Oct. 18, 2017, which claims the benefit of Japanese Patent Application No. 2016-210218, filed Oct. 27, 2016, Japanese Patent Application No. 2017-021806, filed Feb. 9, 2017 and Japanese Patent Application No. 2017-021803, filed Feb. 9, 2017, the entire contents of each are hereby incorporated by reference.

TECHNICAL FIELD

The present invention relates to a dielectric welding film, and a welding method using the dielectric welding film.

Specifically, the present invention relates to a dielectric welding film, which is usable for adherends of different types and is capable of providing a large adhesivity through a relatively short period of dielectric heating (sometimes referred to as high-frequency dielectric heating hereinafter), and a welding method using the dielectric welding film.

BACKGROUND ART

In order to weld a plurality of typically hard-to-bond adherends (i.e. difficult to be bonded), it has been recently proposed that, for instance, a welding process such as dielectric heating, induction heating, ultrasonic welding or laser welding is performed with an adhesive produced by blending a heat-generating material in a predetermined resin.

According to a proposed welding method by dielectric heating among the above, an adhesive blended with carbon black (CB), silicon carbide (SiC), or the like is interposed between a plurality of adherends and dielectric heating at a frequency of 28 or 40 MHz or microwave heating is applied to weld the plurality of adherends (see Patent Literatures 1 and 2).

According to another proposed welding method by the dielectric heating, polyolefin resin is blended with a ferroelectric material and a carbon compound, a conductive material or the like to prepare an adhesive with a dissipation factor (tan δ) of 0.03 or more, and the adhesive is interposed between a plurality of adherends to adhere the adherends through dielectric heating at a frequency of 40 MHz (see Patent Literatures 3 and 4).

According to still another proposed related art, an adhesive composition for dielectric heating is produced by adding a dielectric heating medium to an adhesive compatible with a plurality of adherends (base materials) to be bonded. The adhesion layer composition for dielectric heating satisfies a formula: $C \times \{(\tan \delta)/\varepsilon'\} \frac{1}{2} \geq d$, where $\varepsilon'$ represents specific permittivity, tan δ represents a dissipation factor, d (mm) represents a total thickness of the base materials to be bonded, and the coefficient C is in a range from 78 to 85 (see Patent Literature 5).

In a further related art, a modified polyolefin resin composition for heat welding and a sheet thereof are disclosed that are designed to provide excellent weldability to a hard-to-bond base material (see Patent Literature 6).

More specifically, the modified polyolefin resin composition is provided by grafting (b) an epoxy-group containing vinyl monomer, (c) an aromatic vinyl monomer and (d) (meth)acrylate polymer to (a) a polyolefin resin. The modified polyolefin resin composition exhibits heat of fusion ranging from 1 to 100 J/g and melting point ranging from 80 to 190 degrees C.

CITATION LIST

Patent Literature(s)

Patent Literature 1 JP 2010-6908 A (claims etc.)
Patent Literature 2 JP 2008-156510 A (claims etc.)
Patent Literature 3 JP 2003-238745 A (claims etc.)
Patent Literature 4 JP 2003-193009 A (claims etc.)
Patent Literature 5 JP 2014-37489 A (claims etc.)
Patent Literature 6 JP 2009-126922 A (claims etc.)

SUMMARY OF THE INVENTION

Problem(s) to Be Solved By the Invention

However, the dielectric heating disclosed in Patent Literatures 1 and 2, in which a considerable amount of the conductive material such as carbon black (CB) is blended in the adhesive to prepare the adhesion layer composition, is likely to cause electric breakdown during the dielectric heating to carbonize a adhered portion and/or the adherends.

In addition, vertical alignment of the adherends is difficult due to the color of the resultant adhesion layer composition (i.e. perfectly opaque black (visible light transmissivity: 0%)).

Accordingly, it is difficult to apply the dielectric heating at an accurate position or adhere correct portions.

The dielectric heating disclosed in Patent Literatures 3 and 4 is also likely to cause electric breakdown during the dielectric heating process due to the considerable amount of the conductive material (e.g. metal and carbide compound) added in the adhesive resin composition.

In addition, vertical alignment of the plurality of adherends is difficult due to the perfect opacity of the resultant adhesion resin composition (visible light transmissivity: 0%).

Accordingly, it is difficult to apply the dielectric heating at an accurate position.

The adhesiveness of the adhesion layer composition for dielectric heating disclosed in Patent Literature 5 is affected by a total thickness of base materials to be adhered, so that the type of usable adherend is likely to be excessively limited.

In addition, at least 40 to 70 seconds of dielectric heating, which is considerably long in terms of practical use, has to be applied in order to ensure sufficient adhesion strength and thus the adhesion layer composition is economically disadvantageous.

Moreover, none of Patent Literatures 1 to 5 discloses or suggests the adhesion layer composition for dielectric heating that is controlled in terms of high-frequency weldability, tensile shear force and high-temperature creep resistance of the dielectric adhesive (welding) agent by controlling a value of heat of fusion (fusion enthalpy) of the adhesive component in the dielectric heating adhesion layer composition.

Still more, it has not been known that sufficient adhesivity can be obtained in a short period of time of dielectric heating by regulating the heat of fusion of the adhesive component within a predetermined range.

Though the modified polyolefin resin composition and the like disclosed in Patent Literature 6 has heat of fusion and melting point defined within a predetermined range, it is not disclosed or suggested that a dielectric filler is contained, so that the disclosed composition is not applicable for a dielectric welding film.

In addition, the main component of the disclosed modified polyolefin resin composition and the like is a grafted polyolefin resin, which is extremely expensive and thus is economically disadvantageous.

In view of the problems of the above related arts, the inventors have found that excellent adhesiveness can be obtained through dielectric heating for, for instance, less than 40 seconds and dielectric fillers with a relatively wide variety of particle sizes are made applicable by controlling the heat of fusion of the thermoplastic resin used for the dielectric welding film. The invention has been made based on the above findings.

An object of the invention is to provide a dielectric welding film applicable to a variety of adherends, capable of providing excellent adhesiveness by a short period of dielectric heating, and capable of using dielectric fillers with a relatively wide variety of mean particle sizes, and provide a welding method using the dielectric welding film.

Means for Solving the Problems

A dielectric welding film according to an aspect of the invention is configured to weld a pair of adherends of the same material or different materials though dielectric heating, the dielectric welding film including: a thermoplastic resin as an A component and a dielectric filler as a B component.

The dielectric welding film satisfies conditions (i) and (ii) below:
(i) a melting point or softening point measured in accordance with JIS K 7121 (1987) is in a range from 80 to 200 degrees C.; and
(ii) heat of fusion measured in accordance with JIS K 7121 (1987) is in a range from 1 to 80 J/g.

The dielectric welding film having the predetermined melting point or the like and the heat of fusion is applicable to a variety of adherends and capable of providing excellent adhesiveness through a short period of dielectric heating.

The dielectric welding film having the predetermined melting point or softening point can achieve a good balance between heat resistance (including high-temperature creep resistance) in a use environment or the like and weldability during the dielectric heating.

In the dielectric welding film according to the above aspect of the invention, it is preferable that a dielectric property (tan $\delta/\epsilon'$) defined by dividing a dissipation factor tan $\delta$ by a permittivity $\epsilon'$ at 23 degrees C. and 40 MHz frequency is 0.005 or more.

The dielectric welding film, whose dielectric property is controlled as in the above, can reliably ensure excellent weldability during the dielectric heating and, consequently, provide strong adhesivity between the pair of adherends.

In the dielectric welding film according to the above aspect of the invention, it is preferable that a content of the B component is in a range from 5 to 800 parts by mass with respect to 100 parts by mass of the A component.

With the above blend ratio of the B component with respect to the A component, the handleability of the dielectric welding film is improvable and excellent adhesiveness can be reliably obtained through a short period of dielectric heating.

In the dielectric welding film according to the above aspect of the invention, it is preferable that the A component is at least one thermoplastic resin selected from the group consisting of a polyolefin resin, an olefin thermoplastic elastomer, a styrene thermoplastic elastomer, a polyamide resin, a polyvinyl acetate resin, a polyacetal resin, and a polyester resin.

The above thermoplastic resin uniformly and rapidly melts through a short period of dielectric heating, so that excellent adhesiveness can be reliably obtained even when the adherend is made of hard-to-bond polypropylene resin, polyester resin or the like.

In the dielectric welding film according to the above aspect of the invention, it is preferable that the (B) component is zinc oxide.

The B component in a form of zinc oxide can exhibit predetermined exothermic effect during the dielectric heating even being blended in the adhesive component (the A component) at a relatively small amount.

In addition, zinc oxide can be uniformly dispersed in the adhesive component (the A component), providing a favorable balance between the transparency of the dielectric welding film and the weldability during the dielectric heating.

In the dielectric welding film according to the above aspect of the invention, it is preferable that a mean particle size of the B component measured in accordance with JIS Z 8819-2 (2001) is in a range from 1 to 30 μm.

The B component, whose mean particle size is regulated within the predetermined range, is more polarized because of an increase in the polarizable distance inside the filler, so that the inversion motion caused when a high-frequency wave is applied can be intensified, thereby improving the dielectric heating performance.

A welding method according to another aspect of the invention uses a dielectric welding film configured to weld a pair of adherends of the same material or different materials though dielectric heating, the dielectric welding film including a thermoplastic resin as an A component and a dielectric filler as a B component and satisfying conditions (i) and (ii):
(i) a melting point or softening point measured in accordance with JIS K 7121 (1987) is in a range from 80 to 200 degrees C.; and
(ii) heat of fusion measured in accordance with JIS K 7121 (1987) is in a range from 1 to 80 J/g, the method including steps (1) and (2):
(1) holding the dielectric welding film between a pair of adherends; and
(2) applying the dielectric heating on the dielectric welding film held between the pair of adherends with a dielectric heater at a high-frequency output ranging from 0.1 to 20 kW and a high-frequency-wave application time of 1 second or more and less than 40 seconds.

The welding method according to the above aspect of the invention using the dielectric welding film is applicable to a variety of adherends and provides excellent adhesiveness through a short period of dielectric heating.

In the welding method using a dielectric welding film according to the above aspect, it is preferable that the dielectric welding film satisfies, in addition to the conditions (i) and (ii), a condition (iii):
a dielectric property (tan $\delta/\epsilon'$) defined by dividing a dissipation factor tan $\delta$ by a permittivity $\epsilon'$ at 23 degrees C. and 40 MHz frequency is 0.005 or more.

The welding method using the above dielectric welding film is applicable to a variety of adherends and provides excellent adhesiveness, high-temperature creep resistance and the like through a short period of dielectric heating.

BRIEF DESCRIPTION OF DRAWING(S)

DESCRIPTION OF EMBODIMENT(S)

First Exemplary Embodiment

Figure 1:
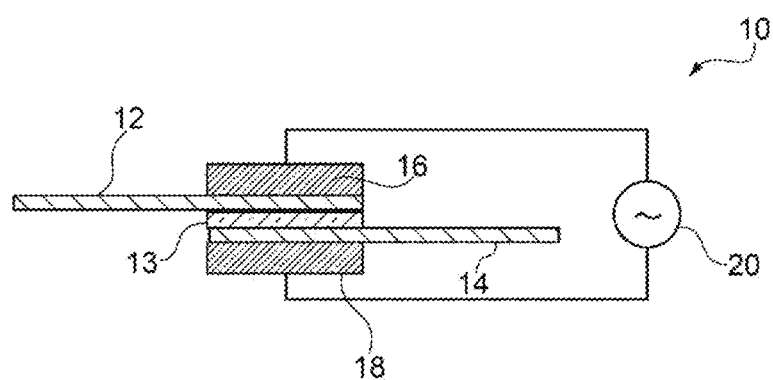
FIG. 1 illustrates dielectric heating performed by a dielectric heater.

A dielectric welding film according to a first exemplary embodiment is configured to weld a pair of adherends of the same material or different materials through dielectric heating, the dielectric welding film including:
a thermoplastic resin as an A component and a dielectric filler as a B component,
the dielectric welding film satisfying conditions (i) and (ii) below:
(i) a melting point or softening point measured in accordance with JIS K 7121 (1987) being in a range from 80 to 200 degrees C.; and
(ii) heat of fusion measured in accordance with JIS K 7121 (1987) being in a range from 1 to 80 J/g.

The components, properties and the like of the dielectric welding film according to the first exemplary embodiment will be specifically described below.
1 Components of Dielectric Welding Film
(1) A Component
Type
The thermoplastic resin as the A component, whose type is not limited, is, for instance, preferably at least one of a polyolefin resin, an olefin thermoplastic elastomer, a styrene thermoplastic elastomer, a polyamide resin, a polyvinyl acetate resin, a polyacetal resin, a polycarbonate resin, a polyacryl resin, a polyamide resin, a polyimide resin, a polyvinyl acetate resin, a phenoxy resin and a polyester resin, which are easily melted and exhibit a predetermined heat resistance.

More specifically, examples of the polyolefin resin include one of or a combination of resins selected from a homopolymer resin such as polyethylene, polypropylene, polybutene and polymethylpentene, and α-olefin resin of a copolymer of ethylene, propylene, butene, hexene, octene, and 4-methylpentene.

Among the polyolefin resin, polypropylene resin is especially preferable in view of easy adjustability in melting point or softening point, low cost and excellent mechanical strength and transparency thereof.

It should be noted that permittivity ($\varepsilon$/1 MHz) of the polypropylene resin used in the invention is preferably in a range from 2.2 to 2.6, dielectric power factor (tan $\delta$/1 MHz) of the polypropylene resin is preferably in a range from 0.0005 to 0.0018, and loss factor of the polypropylene resin is preferably approximately 0.0047.

When a crystalline polyester resin is used, permittivity ($\varepsilon$/1 MHz) of the crystalline polyester resin is preferably in a range from 2.8 to 4.1, dielectric power factor (tan $\delta$/1 MHz) of the crystalline polyester resin is preferably in a range from 0.005 to 0.026, and loss factor of the crystalline polyester resin is preferably in a range from 0.0168 and 0.11.

Melting Point Or Softening Point

The melting point or softening point of the A component is preferably in a range from 80 to 200 degrees C.

Specifically, the A component as a crystalline resin, whose melting point (i.e. a temperature at which a crystalline portion is melted) measured by a differential scanning calorimeter (DSC) or the like is defined within a predetermined range, can achieve a good balance between heat resistance in a use environment and the like and weldability during the dielectric heating.

More specifically, the melting point may be determined using a differential scanning calorimeter by: raising a temperature of 10 mg measurement sample (first thermoplastic resin) to 250 degrees C.; cooling the measurement sample to 25 degrees C. at a temperature-decrease rate of 10 degrees C./min to crystallize the measurement sample; again heating the measurement sample at a temperature-increase rate of 10 degrees C./min to re-melt the sample; and measuring a peak temperature of a melting peak observed on a DSC chart (fusion curve) when the sample is re-melted.

The A component as an amorphous resin, whose softening point (glass transition point) (i.e. a temperature at which an amorphous portion is melted) measured in accordance with a ring-and-ball method or the like is defined within a predetermined range, can also achieve a good balance between heat resistance and weldability during the dielectric heating.

More specifically, the softening point of the A component can be measured in accordance with JIS K 6863 (1994).

In either case, when the melting point or the softening point of the A component falls below 80 degrees C., the heat resistance may become so insufficient that the applicable range may be excessively limited and/or mechanical strength may be significantly reduced.

In contrast, when the melting point or the softening point of the A component exceeds 200 degrees C., welding through the dielectric heating may take excessively long time and/or the bonding strength may be excessively decreased.

The melting point or softening point of the first thermoplastic resin of the A component is thus more preferably in a range from 100 to 190 degrees C., further preferably from 130 to 180 degrees C.

It should be noted that, though below-described melting point or softening point of the dielectric welding film are preferably in the same range as that of the A component, the above melting point or the softening point is specific to the A component.
Average Molecular Weight An average molecular weight (weight average molecular weight) of the A component is usually preferably in a range from 5000 to 300000.

This is because, when the weight average molecular weight of the A component falls below 5000, the heat resistance and/or the adhesion strength may be significantly reduced.

Meanwhile, when the weight average molecular weight of the A component exceeds 300000, the weldability and the like in the dielectric heating may be significantly reduced.

The weight average molecular weight of the A component is thus more preferably in a range from 10000 to 200000, further preferably from 30000 to 100000.

It should be noted that the weight average molecular weight of the A component can be measured through, for instance, intrinsic viscosity method or gel permeation chromatography (GPC) in accordance with JIS K 7367-3 (1999).

Melt Flow Rate

The melt flow rate (MFR) of the A component is usually preferably in a range from 1 to 300 g/10 min at 230 degrees C. under 2.16 kg load, though depending on the weight average molecular weight.

When the MFR is 1 g/10 min or more, the heat resistance at the adhered portion is relatively improved.

In contrast, with the MFR of 300 g/10 min or less, the adhesion time through the dielectric heating can be reduced and stable adhesiveness can be obtained.

The MFR is thus more preferably in a range from 1 to 100 g/10 min, further preferably from 1 to 50 g/10 min.

It should be noted that the MFR can be measured in accordance with JIS K 7210-1 (2014) at 230 degrees C. under 2.16 kg load.

(2) B Component

Type

The type of the dielectric filler is not limited as long as the dielectric filler is a high-frequency wave absorbing filler having a high dielectric loss factor enough to generate heat when a high-frequency wave of, for instance, 28 MHz or 40 MHz frequency is applied.

The dielectric filler preferably is a single one of or a combination of two or more of compounds selected from zinc oxide, silicon carbide (SiC), anatase-type titanium oxide, barium titanate, barium zirconate titanate, lead titanate, potassium niobate, rutile-type titanium oxide, hydrated aluminum silicate, inorganic substance having crystallization water such as hydrated aluminosilicate salt of alkali metal or alkaline earth metal, and the like.

Among the above, zinc oxide and silicon carbide, which include various types, provide a wide selection of shapes and sizes, allow modification of welding and mechanical properties of the dielectric welding film depending on the intended use, and are capable of generating a lot of heat in a relatively small amount, are especially preferable as the dielectric filler.

Content

The content of the B component is preferably in a range from 5 to 800 parts by mass with respect to 100 parts by mass of the A component.

This is because, when the content of the B component becomes excessively small, heat-generating performance may become poor, so that the A component may be less likely to be melted, failing to provide strong welding after the dielectric heating.

In contrast, excessively large content of the B component may excessively lower fluidity of the dielectric welding film during the dielectric heating.

The content of the B component is thus preferably in a range from 30 to 600 parts by mass with respect to 100 parts by mass of the A component, more preferably in a range from 50 to 300 parts by mass.

Mean Particle Size

A mean particle size (median diameter: D50) of the B component measured in accordance with JIS Z 8819-2 (2001) is preferably in a range from 0.1 to 30 μm.

This is because, when the mean particle size is less than 0.1 μm, polarizable distance inside the filler is reduced so that the filler is less polarized, though depending on the type of the filler. Inversion motion caused when high-frequency wave is applied is thus attenuated to cause excessive decrease in the dielectric heating performance, possibly making it difficult to achieve tight adhesion between adherends.

In contrast, as the mean particle size increases, the filler is more polarized because of the increase in the polarizable distance inside the filler, so that the inversion motion caused when a high-frequency wave is applied is intensified, thereby improving the dielectric heating performance.

However, when the mean particle size exceeds 30 μm, the distance between neighboring dielectric fillers becomes short and the inversion motion caused when a high-frequency wave is applied is attenuated due to electric charge of the neighboring dielectric fillers, so that the dielectric heating performance may be excessively reduced and the adherends may be less tightly welded.

The mean particle size of the B component is thus more preferably in a range from 1 to 30 μm, further preferably from 2 to 25 μm, most preferably from 3 to 20 μm.

(3) Additive

The dielectric welding film is preferably added with at least one of additives such as tackifier, plasticizer, wax, coloring agent, antioxidant, ultraviolet absorber, antibacterial agent, coupling agent, viscosity modifier, and organic or inorganic filler other than the dielectric filler.

The tackifier and the plasticizer can improve melting and welding properties of the dielectric welding film. Examples of the tackifier include rosin derivative, polyterpene resin, aromatic modified terpene resin and hydrogenated products thereof, terpene phenol resin, coumarone-indene resin, aliphatic petroleum resin, and aromatic petroleum resin and hydrogenated products thereof.

Examples of the plasticizer include petroleum process oil such as paraffin process oil, naphthene process oil and aromatic process oil, natural oil such as castor oil and tall oil, and low-molecular-weight liquid polymer such as diacid dialkyl (e.g. dibutyl phthalate, dioctyl phthalate, and dibutyl adipate), liquid polybutene and liquid polyisoprene.

When the additive is added, the content of the additive is typically preferably in a range from 0.1 to 20 mass % of a total amount of the dielectric welding film, more preferably in a range from 1 to 10 mass %, further preferably in a range from 2 to 5 mass %, though depending on the type and purpose of the additive.

2 Dielectric Welding Film (1) Thickness The thickness of the dielectric welding film is typically preferably in a range from 10 to 2000 μm.

This is because, when the thickness of the dielectric welding film is 10 μm, the adhesion strength between the adherends sometimes rapidly decreases.

On the other hand, when the thickness of the dielectric welding film exceeds 2000 μm, it is sometimes difficult to wind the dielectric welding film into a roll and to apply the dielectric welding film to a roll-to-roll process.

Accordingly, the thickness of the dielectric welding film is typically more preferably in a range from 100 to 1000 μm, further preferably in a range from 200 to 600 μm, though depending on the usage of the dielectric welding film and the like.

(2) Dielectric Property (tan δ/ε')

The dissipation factor (tan δ) and permittivity (ε') as the dielectric property of the dielectric welding film, which may be measured in accordance with JIS C 2138:2007, can be easily and accurately measured in accordance with impedance material method.

The dielectric property (tan δ/ε'), which is obtained by dividing dissipation factor (tan δ) measured with an impedance material analyzer or the like by permittivity (ε') measured in the same manner, is preferably 0.005 or more.

This is because, when the dielectric property is less than 0.005, the dielectric welding film does not generate heat as desired through the dielectric heating irrespective of the type of the A component and the like, sometimes making it difficult to tightly adhere the adherends.

However, when the value of the dielectric property becomes excessively large, it sometimes occurs that the types of usable A component and dielectric filler are excessively limited and/or total light transmissivity is rapidly reduced.

Accordingly, the dielectric property of the dielectric welding film is more preferably in a range from 0.008 to 0.05, further preferably in a range from 0.01 to 0.03.

The measurement method of the dielectric property of the dielectric welding film will be detailed below in later-described Example 1.

(3) Total Light Transmissivity

Total light transmissivity of the dielectric welding film is preferably 1% or more.

This is because, when the total light transmissivity (%) is less than 1%, it may become virtually difficult to locate the dielectric welding film (of an excessive thickness) at a predetermined point through visual check.

Though the upper limit of the total light transmissivity of the dielectric welding film is not specifically limited, excessively large total light transmissivity may excessively restrict the types of the usable A component or B component.

Accordingly, the total light transmissivity of the dielectric welding film is more preferably in a range from 5 to 99%, further preferably in a range from 10 to 95%.

It should be noted that the total light transmissivity has been found to be usually approximately 50% when a suitable polyolefin resin (the A component) and suitable dielectric filler (the B component) are blended at a suitable ratio (approximately 100 parts by weight:156 parts by weight).

The measurement method of the total light transmissivity (%) of the dielectric welding film will be detailed below in later-described Example 1.

(4) Melting Point or Softening Point

The melting point or softening point of the dielectric welding film is in a range from 80 to 200 degrees C.

As described above, the melting point or softening point of the dielectric welding film can be measured with a differential scanning calorimeter (DSC) or the like in the same manner as that of the A component.

When the melting point or the softening point of the dielectric welding film falls below 80 degrees C., high-temperature creep resistance is sometimes significantly reduced due to insufficient heat resistance, impairing preservation stability of the welded adherend.

Meanwhile, when the melting point or the softening point of the dielectric welding film exceeds 200 degrees C., welding through the dielectric heating may take an excessively long time and/or the adhesion strength may rather be excessively decreased.

The melting point or softening point of the dielectric welding film is thus more preferably in a range from 100 to 190 degrees C., further preferably from 130 to 180 degrees C.

(5) Heat of Fusion

The heat of fusion measured in accordance with JIS K 7121 (1987) is in a range from 1 to 80 J/g.

This is because the dielectric welding film having the above heat of fusion can achieve an favorable balance between heat resistance in a use environment or the like and weldability during the dielectric heating.

More specifically, when the heat of fusion is less than 1 J/g, the high-frequency weldability, the adhesivity (tensile shear force), and the high-temperature creep resistance may be significantly reduced due to insufficient heat resistance.

Meanwhile, when the heat of fusion exceeds 80 J/g, welding through the dielectric heating may take an excessively long time and/or the resultant adhesivity (tensile shear force) may be excessively decreased.

The heat of fusion is thus more preferably in a range from 5 to 70 J/g, further preferably from 10 to 60 J/g.

It should be noted that, when a plurality of the melting peaks are present in the resultant DSC chart depending on the content of the additive and the like, the heat of fusion of the dielectric welding film can be calculated based on a sum of the plurality of melting peaks.

(6) Viscoelastic Property

With regard to viscoelastic property (dynamic elastic modulus) of the dielectric welding film, it is preferable that storage modulus (E') measured at 10 Hz frequency is in a range from $1 \times 10^6$ to $1 \times 10^{10}$ Pa both at a room temperature and at 80 degrees C.

This is because, when the storage modulus is less than $1 \times 10^6$ Pa at a room temperature or at 80 degrees C., the surface of the dielectric welding film may become tacky to cause blocking, which makes it difficult to store the dielectric welding film in a roll.

On the other hand, when the storage modulus exceeds $1 \times 10^{10}$ Pa at a room temperature or at 80 degrees C., the dielectric welding film may become brittle to make it difficult to unroll the dielectric welding film or adhere the dielectric welding film on an adherend while applying a high tension.

Second Exemplary Embodiment

A welding method according to a second exemplary embodiment uses a dielectric welding film for welding a pair of adherends of the same material or different materials through dielectric heating, the dielectric welding film including a thermoplastic resin as the A component and a dielectric filler as the B component and satisfying the conditions (i) and (ii) below:
(i) a melting point or softening point measured in accordance with JIS K 7121 (1987) being in a range from 80 to 200 degrees C.; and
(ii) heat of fusion measured in accordance with JIS K 7121 (1987) being in a range from 1 to 80 J/g, the method including the following steps (1) and (2) of:
(1) holding the dielectric welding film between a pair of adherends; and
(2) applying the dielectric heating on the dielectric welding film held between the pair of adherends with a dielectric heater at a high-frequency output ranging from 0.1 to 20 kW and a high-frequency wave application time of 1 second or more and less than 40 seconds.

The welding method of the dielectric welding film according to the second exemplary embodiment will be described below mainly on features different from those in the first exemplary embodiment.

1. Step (1)

In the step (1), the dielectric welding film is disposed at a predetermined position, where the dielectric welding film is held between the plurality of adherends of the same material or different materials.

At this time, it is usually preferable to hold the dielectric welding film between the plurality of adherends after the dielectric welding film is cut into piece(s) of a predetermined shape.

Moreover, it is also preferable, in order to locate the dielectric welding film at a correct position without position gap, to provide a sticky portion all over or on a part of one side or both sides of the dielectric welding film, and/or to provide a temporary fixing hole or projection on a part of the dielectric welding film.

The material of the adherend used in the second exemplary embodiment is not specifically limited but may be any one of an organic material, an inorganic material or metal material or a composite of the organic, inorganic and metal materials. Examples of the organic material include a plastic material such as polypropylene resin, polyethylene resin, acrylonitrile-butadiene-styrene copolymer resin (ABS resin), polycarbonate resin, polyamide resin (e.g. Nylon 6, Nylon 66), polybutylene terephthalate resin (PBT resin), polyacetal resin (POM resin), polymethyl methacrylate resin and polystyrene resin, and a rubber material such as styrene-butadiene rubber (SBR), ethylene propylene rubber (EPR) and silicone rubber. Examples of the organic material include glass.

A fiber-reinforced resin (FRP), which is a composite of glass fiber and the above plastic material, is also preferable as the material of the adherend.

2. Step (2)

In the step (2), dielectric heating is applied on the dielectric welding film held between the plurality of adherends with a dielectric heater, for instance, at a high-frequency output ranging from 0.1 to 20 kW and a high-frequency wave application time of 1 second or more and less than 40 seconds as shown in FIG. 1.

The dielectric welding machine used in the step (2) and dielectric heating conditions thereof will be described below.

(1) Dielectric Welding Machine

As shown in FIG. 1, a dielectric welding machine 10 performs dielectric heating through a dielectric welding film 13 held between a first adherend 12 and a second adherend 14 and applies pressure by a first high-frequency electrode 16 and a second high-frequency electrode 18 to adhere the first adherend 12 and the second adherend 14.

The dielectric welding machine 10 includes a high-frequency power source 20 configured to apply a high-frequency wave of approximately 28 MHz or 40 MHz frequency to each of the oppositely disposed first high-frequency electrode 16 and second high-frequency electrode 18.

When a high-frequency electric field is created between the electrodes, high-frequency wave energy is absorbed by the dielectric welding film (more specifically, dielectric heating medium uniformly dispersed in the dielectric welding film) at a part at which the first adherend and the second adherend are overlapped.

The dielectric heating medium serves as a heat source, the heat generated by the dielectric heating medium melting the olefin resin (i.e. the main component of the dielectric welding film) and thereby welding the first adherend and the second adherend.

Subsequently, compression force is applied by the first high-frequency electrode 16 and the second high-frequency electrode 18 serving also as a press machine as shown in FIG. 5. The melting of the dielectric welding film 13 in combination with the compression force applied by the electrodes 16 and 18 achieves tight adhesion of the first adherend 12 and the second adherend 14.

(2) Dielectric Heating Conditions

Though the dielectric welding conditions can be altered as desired, the high-frequency output is usually preferably in a range from 0.1 to 20 kW, more preferably in a range from 0.2 to 10 kW, further preferably in a range from 0.2 to 5 kW.

The application time of the high-frequency wave is preferably 1 second or more and less than 40 seconds, more preferably in a range from 5 to 30 seconds, further preferably in a range from 10 to 20 seconds.

The frequency of the high-frequency wave is preferably in a range from 1 to 100 MHz, more preferably in a range from 5 to 80 MHz, further preferably in a range from 10 to 50 MHz. Specifically, 13.56 MHz, 27.12 MHz, and 40.68 MHz of ISM band allocated by the International Telecommunication Union are used in the dielectric welding method according to the second exemplary embodiment.

EXAMPLES

Example 1

1. Preparation of Dielectric Welding Film 100 parts by mass of a random polypropylene resin as the A component (Prime Polypro F-744NP manufactured by Prime Polymer Co., Ltd., melting point: 130 degrees C., referred to as A1-1 in Table 1) and 156 parts by mass of zinc oxide (LPZINC11 manufactured by Sakai Chemical Industry Co., Ltd., mean particle size: 11 μm, referred to as B1 in Table 1) were weighed and each put into a vessel.

Subsequently, as shown in Table 1, the A component and B component were preliminarily blended and then were fed into a hopper of a biaxial extruder of 30 mm diameter, where the components were melted and kneaded at a cylinder set temperature in a range from 180 to 200 degrees C. and a die temperature of 200 degrees C. to obtain granular pellets.

Then, the obtained granular pellets were put into a hopper of a uniaxial extruder provided with a T-die, and a 400-μm thick film-shaped molten kneaded product was extruded from the T-die at a cylinder temperature of 200 degrees C. and a die temperature of 200 degrees C., and cooled to a room temperature to obtain the dielectric welding film of Example 1.

Figure 2A:
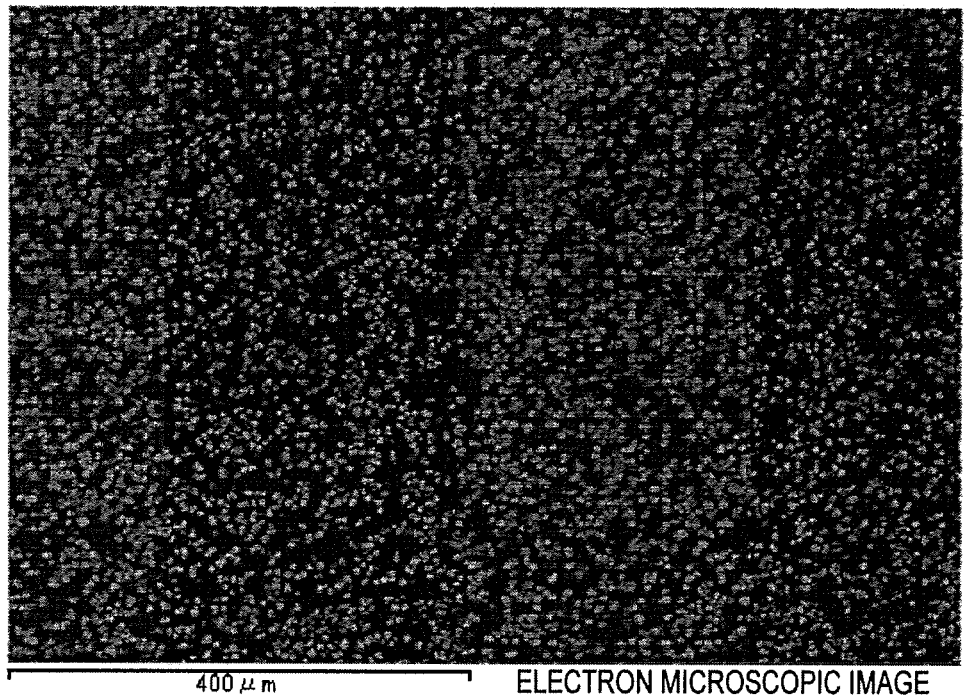
FIG. 2A shows a surface of the dielectric welding film according to an exemplary embodiment of the invention (photograph, 150× magnification).
Figure 2B:
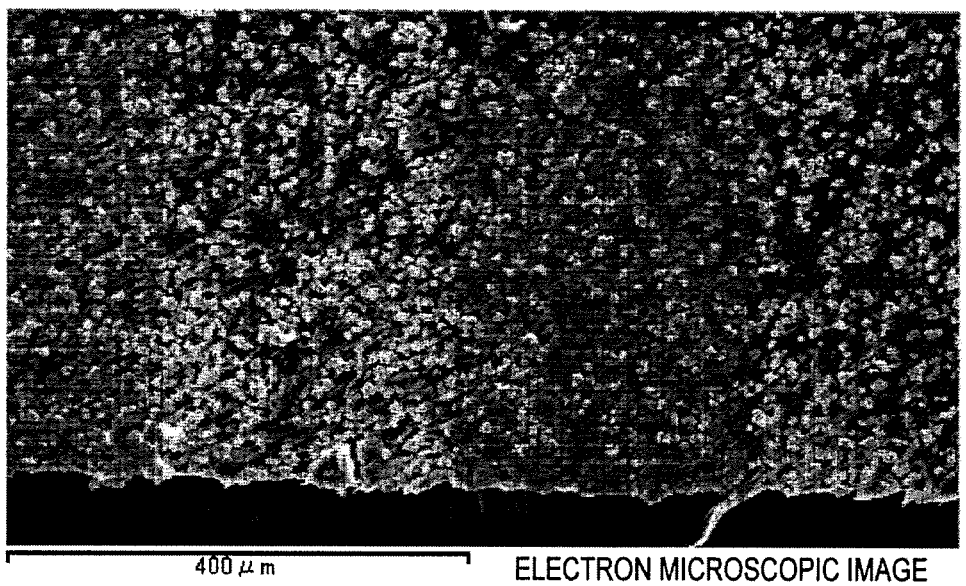
FIG. 2B shows a cross section of the dielectric welding film according to an exemplary embodiment of the invention (photograph, 150× magnification).

A surface of the dielectric welding film and a cross section of the dielectric welding film are shown in photographs (150× magnification) in FIGS. 2A and 2B respectively.

2 Evaluation of Dielectric Welding Film (1) Average Thickness

Thicknesses of the dielectric welding film cut into a predetermined size were measured at 10 spots with a micrometer and an average of the thicknesses was calculated to obtain an average thickness (sometimes simply referred to as "thickness" hereinafter) of the dielectric welding film.

(2) Heat of Fusion

A DSC chart (fusion curve) of the dielectric welding film was obtained using a differential scanning calorimeter (DSC) (Q2000 manufactured by TA Instruments), and the heat of fusion of the A1 component was calculated based on a predetermined area corresponding to the melting peak of the DSC chart.

(3) Melting Point or Softening Point

Melting point of the dielectric welding film was measured with a differential scanning calorimeter (DSC) (Q2000 manufactured by TA Instruments).

More specifically, the melting point was determined by: raising a temperature of 10-mg measurement sample (dielectric welding film) to 250 degrees C.; cooling the measurement sample to 25 degrees C. at a temperature-decrease rate of 10 degrees C./min to crystallize the measurement sample; again heating the measurement sample at a temperature-increase rate of 10 degrees C./min to re-melt the sample; and measuring a peak temperature of a melting peak observed on a DSC chart (fusion curve) when the sample was re-melted.

(4) Dielectric Property (tan δ/ε')

With an impedance material analyzer E4991 (manufactured by Agilent Technologies, Inc.), the permittivity (ε') and dissipation factor (tan δ) of the dielectric welding film cut into a predetermined size were measured at 23 degrees C. and 40 MHz frequency to calculate the value of the dielectric property (tan δ/ε').

(5) Total Light Transmissivity

The total light transmissivity of the dielectric welding film cut into a predetermined size was measured in accordance with JIS K 7361-1 (1997) with a haze meter NDH5000 manufactured by NIPPON DENSHOKU INDUSTRIES CO., LTD. under Illuminant D65.

(6) High-Frequency Weldability

A dielectric welding film (welding film) cut into a predetermined size was held at a predetermined position between two glass-reinforced polypropylene plates (25 cm×10 cm×1.5 mm) as adherends.

Subsequently, while the plates were held between electrodes of a high-frequency dielectric heater (YRP-400T-A manufactured by YAMAMOTO VINITA CO., LTD), a high-frequency wave of 40 MHz frequency and 200 W output was applied for a predetermined time to prepare a test piece (i.e. adherends welded through the welding film).

High-frequency weldability of the obtained test piece was evaluated in accordance with the criteria below.

◎: The adherends were welded through the welding film by applying the high-frequency wave for less than 10 seconds.

○: The adherends were welded through the welding film by applying the high-frequency wave for a time period of 10 seconds or more and less than 40 seconds.

Δ: The adherends were welded through the welding film by applying the high-frequency wave for a time period of 40 seconds or more and less than 60 seconds.

x: The adherends were not welded through the welding film even after applying the high-frequency wave for 60 seconds.

(7) Tensile Shear Test

With a universal tensile tester (Instron 5581 manufactured by Instron Corporation), a tensile shear force of the test piece obtained in the evaluation in "(6) High-Frequency Weldability" was measured at a tension rate of 100 mm/min, and was observed in terms of destroy mode.

◎: Material failure or cohesive failure occurred and the tensile shear strength was 6 MPa or more.

○: Material failure or cohesive failure occurred and the tensile shear strength was 2 MPa or more and less than 6 MPa.

Δ: Interfacial peeling occurred and the tensile shear strength was less than 2 MPa.

x: The test piece was not welded in the evaluation of the high-frequency weldability, or the weld could not be kept until the test (i.e. adherend was dropped off), so that the tensile shear test was not available.

(8) High-Temperature Creep Test

After a 100-gram weight was attached to an end of the test piece obtained in the above evaluation of "(6) High-Frequency Weldability," the test piece was placed in an oven at 80 degrees C. with the weight being suspended therefrom, and was left still for 24 hours.

Lastly, the test piece, after taken out of the oven and returned to a room temperature, was evaluated in terms of the high-temperature creep in accordance with the criteria below.

◎: The weight was kept attached after the elapse of 24 hours.

○: Though kept attached until an elapse of 12 hours, the weight was dropped off after the elapse of 24 hours.

Δ: The weight was dropped off at or within 12 hours.

x: The test piece was not welded in the evaluation of the high-frequency weldability, or the weld could not be kept until the test (i.e. the adherend was dropped off), so that the high-temperature creep test was not available.

Example 2

In Example 2, the dielectric welding film was prepared and evaluated in the same manner as that of Example 1 except that the A component was changed to an olefin thermoplastic elastomer (ESPOLEX TPE-4675 manufactured by Sumitomo Chemical Co., Ltd., melting point: 160 degrees C., referred to as A-2 in Table 1).

Example 3

In Example 3, the dielectric welding film was prepared and evaluated in the same manner as that of Example 1 except that the A component was changed to a styrene thermoplastic elastomer (ESPOLEX SB-2400 manufactured by Sumitomo Chemical Co., Ltd., melting point: 162 degrees C., referred to as A-3 in Table 1).

Example 4

In Example 4, the dielectric welding film was prepared and evaluated in the same manner as that of Example 1 except that the A component was changed to a combination of 70 parts by mass of A-1 used in Example 1 and 30 parts by mass of a maleic anhydride modified polypropylene (UMEX 1001, manufactured by Sanyo Chemical Industries, Ltd., melting point: 142 degrees C., referred to as A-4 in Table 1).

Example 5

In Example 5, the dielectric welding film was prepared and evaluated in the same manner as that of Example 1 except that the A component was changed to an ethylene-(meth)acrylate copolymer (Nucrel 410 manufactured by DUPONT-MITSUI POLYCHEMICALS CO., LTD., melting point: 98 degrees C., referred to as A-5 in Table 1).

Example 6

The dielectric welding film of Example 6 was prepared and evaluated in the same manner as that of Example 1 except that the B component was changed to 156 parts by mass of zinc oxide (LPZINC2 manufactured by Sakai Chemical Industry Co., Ltd., mean particle size: 2 μm, specific weight: 5.6, referred to as B-2 in Table 1).

Example 7

The dielectric welding film of Example 7 was prepared and evaluated in the same manner as that of Example 1 except that the B component was changed to 156 parts by mass of silicon carbide (GMF15 manufactured by Pacific Rundum Co., Ltd., mean particle size: 0.5 μm, specific weight: 5.6, referred to as B-3 in Table 1).

Example 8

The dielectric welding film of Example 8 was prepared and evaluated in the same manner as that of Example 1 except that 100 parts by mass of a crystalline polyester resin (Vylon GM-915 manufactured by TOYOBO CO., LTD., melting point: 139 degrees C., weight average molecular weight: 45000, referred to as A-6 in Table 1) was used as the A component and the adherends were changed to a combination of a glass-fiber-reinforced polypropylene plate and an ABS plate (both 15 cm×10 cm×1.5 mm).

Example 9

The dielectric welding film of Example 9 was prepared and evaluated in the same manner as that of Example 1 except that 100 parts by mass of a crystalline polyester resin (Vylon GM-920 manufactured by TOYOBO CO., LTD., melting point: 107 degrees C., weight average molecular weight: 30000, referred to as A-7 in Table 1) was used as the A component, 156 parts by mass of zinc oxide (manufactured by Wako Pure Chemical Industries Ltd., mean particle size 0.4 µm, specific weight: 5.6, referred to as B-4 in Table 1) was used as the B component, and the adherends were changed to a combination of a glass-fiber-reinforced polypropylene plate and an ABS plate (both 15 cm×10 cm×1.5 mm).

Example 10

In Example 10, a dielectric welding film was prepared and evaluated in the same manner as that of Example 1 except that the content of the B-1 used in Example 1 was changed to 267 parts by mass.

Example 11

In Example 11, a dielectric welding film was prepared and evaluated in the same manner as that of Example 1 except that the content of the B-1 used in Example 1 was changed to 67 parts by mass.

Comparative 1

In Comparative 1, the dielectric welding film was prepared and evaluated in the same manner as that of Example 1 except that the A component was changed to 100 parts by mass of homopolypropylene (NOVATEC PPMH4 manufactured by Japan Polypropylene Corporation, melting point: 165 degrees C., MFR: 5 g/10 min, referred to as A-8 in Table 1), and the B component was changed to 156 parts by mass of zinc oxide B4 used in Example 9.

Comparative 2

The dielectric welding film of Comparative 2 was prepared and evaluated in the same manner as that of Example 1 except that 100 parts by mass of random polypropylene (A1) was solely used and no B component was blended.

Comparative 3

In Comparative 3, the dielectric welding film was prepared and evaluated in the same manner as that of Example 1 except that the A component was changed to 100 parts by mass of an ethylene-α-olefin copolymer (EXCELLEN FX352 manufactured by SUMITOMO CHEMICAL Co., Ltd., melting point: 70 degrees C., MFR: 4 g/10 min, referred to as A1-9 in Table 1), and the B component was changed to 156 parts by mass of zinc oxide B4 used in Example 9.

TABLE 1

| | | | Example | | | | | | | |
|---|---|---|---|---|---|---|---|---|---|---|
| | | | 1 | 2 | 3 | 4 | 5 | 6 | 7 | 8 |
| Resin Composition (parts by weight) | (A) Component | Random polypropylene (A-1) | 100 | | | 70 | | 100 | 100 | |
| | | Olefin thermoplastic elastomer (A-2) | | 100 | | | | | | |
| | | styrene thermoplastic elastomer (A-3) | | | 100 | | | | | |
| | | Maleic anhydride modified polyproplylene (A-4) | | | | 30 | | | | |
| | | Ethylene-(meth)acrylate copolymer (A-5) | | | | | 100 | | | |
| | | Crystalline polyester resin (A-6) | | | | | | | | 100 |
| | | Crystalline polyester resin (A-7) | | | | | | | | |
| | | Homo polypropylene (A-8) | | | | | | | | |
| | | Ethylene/α-olefin copolymer (A-9) | | | | | | | | |
| | (B) Component | 11-µm zinc oxide (B-1) | 156 | 156 | 156 | 156 | 156 | | | 156 |
| | | 2-µm zinc oxide (B-2) | | | | | | 156 | | |
| | | 0.4-µm zinc oxide (B-3) | | | | | | | | |
| | | 0.5-µm silicon carbide (B-4) | | | | | | | 152 | |
| Properties/test results of welding film | | (1) Thickness (µm) | 400 | 400 | 400 | 400 | 400 | 400 | 400 | 400 |
| | | (2) Heat of fusion (J/g) | 60 | 8 | 10 | 51 | 20 | 80 | 59 | 7 |
| | | (3) Melting point/softening point (° C.) | 130 | 158 | 162 | 130 | 100 | 130 | 133 | 139 |
| | | (4) Dielectric property (tanδ/E') | 0.016 | 0.017 | 0.018 | 0.015 | 0.017 | 0.039 | 0.003 | 0.017 |
| | | (5) Total light transmissivity (%) | 24 | 20 | 20 | 18 | 23 | 13 | 5 | 21 |
| | | (6) High-frequency weldability | ◯ | ◎ | ◎ | ◯ | ◎ | ◯ | △ | ◎ |
| | | (7) Tensile shear test | ◎ | ◯ | ◯ | ◎ | ◯ | ◎ | ◯ | ◯ |
| | | (8) High-temperature creep resistance | ◎ | ◎ | ◎ | ◎ | ◎ | ◎ | ◎ | ◎ |

TABLE 1-continued

|  |  |  | Example | | | Comparative | | |
| --- | --- | --- | --- | --- | --- | --- | --- | --- |
|  |  |  | 9 | 10 | 11 | 1 | 2 | 3 |
| Resin Composition (parts by weight) | (A) Component | Random polypropylene (A-1) |  | 100 | 100 |  | 100 |  |
|  |  | Olefin thermoplastic elastomer (A-2) |  |  |  |  |  |  |
|  |  | styrene thermoplastic elastomer (A-3) |  |  |  |  |  |  |
|  |  | Maleic anhydride modified polyproplylene (A-4) |  |  |  |  |  |  |
|  |  | Ethylene-(meth)acrylate copolymer (A-5) |  |  |  |  |  |  |
|  |  | Crystalline polyester resin (A-6) |  |  |  |  |  |  |
|  |  | Crystalline polyester resin (A-7) | 100 |  |  |  |  |  |
|  |  | Homo polypropylene (A-8) |  |  |  | 100 |  |  |
|  |  | Ethylene/α-olefin copolymer (A-9) |  |  |  |  |  | 100 |
|  | (B) Component | 11-μm zinc oxide(B-1) |  | 287 | 69 |  |  |  |
|  |  | 2-μm zinc oxide (B-2) |  |  |  |  |  |  |
|  |  | 0.4-μm zinc oxide (B-3) | 156 |  |  | 156 |  | 156 |
|  |  | 0.5-μm silicon carbide (B-4) |  |  |  |  |  |  |
| Properties/test results of welding film |  | (1)Thickness (μm) | 400 | 400 | 400 | 400 | 400 | 400 |
|  |  | (2) Heat of fusion (J/g) | 4 | 58 | 60 | 101 | 80 | 10 |
|  |  | (3) Melting point/softening point (° C.) | 99 | 130 | 130 | 185 | 130 | 70 |
|  |  | (4) Dielectric property (tanδ/ε') | 0021 | 0.027 | 0008 | 0.004 | 0.001 | 0.012 |
|  |  | (5) Total light transmissivity (%) | 20 | 18 | 29 | 1> | 87 | 1> |
|  |  | (6) High-frequency weldability | ○ | ○ | ○ | X | X | ○ |
|  |  | (7) Tensile shear test | ○ | ◎ | ◎ | X | X | ○ |
|  |  | (8) High-temperature creep resistance | ◎ | ◎ | ◎ | X | X | X |

INDUSTRIAL APPLICABILITY

The dielectric welding film or the like of the invention, which has a predetermined melting point or softening point and heat of fusion regulated within a predetermined range, is capable of providing tight adhesivity to a variety of adherends through a short period of dielectric heating.

A predetermined transparency (total light transmissivity) of the dielectric welding film of the invention can also be ensured. Accordingly, the dielectric welding film can be placed onto a desired portion on an adherend without using any positioning member.

According to the welding method with the use of the dielectric welding film of the invention, a predetermined position can be locally heated by a dielectric heater from an outside. Thus, the welding method is very effective in adhering adherends of a large-sized and complicated three-dimensional structure or a thick complicated three-dimensional structure with high dimensional accuracy.

Further, the dielectric welding film or the like of the invention allows appropriate control of the thickness and storage modulus of the welding film and the like, and thus is applicable to a roll-to-roll process. Moreover, the dielectric welding film or the like can be designed into any size and shape by punching or the like depending on the adhesion area and shape between the plurality of adherends, providing great advantage in the production process.

The invention claimed is:

1. A dielectric welding film configured to weld a pair of adherends of the same material or different materials through dielectric heating, the dielectric welding film comprising:

a thermoplastic resin as an A component; and a dielectric filler as a B component, wherein the A component is at least one thermoplastic resin selected from the group consisting of a polyolefin resin, an olefin thermoplastic elastomer, a polyamide resin, a polyvinyl acetate resin, a polyacetal resin, and a polyester resin, wherein when the A component contains a polyolefin resin, the polyolefin resin is one of or a combination of resins selected from a homopolymer resin including polyethylene, polypropylene, polybutene and polymethylpentene, and a α-olefin resin of a copolymer of ethylene, propylene, butene, hexene, octene, and 4-methylpentene, the B component is zinc oxide, a mean particle size of the B component measured in accordance with JIS Z 8819-2 (2001) is in a range from 1 to 30 μm, a dielectric property (tan δ/ε') defined by dividing a dissipation factor tan δ of the dielectric welding film by a permittivity ε' of the dielectric welding film at 23 degrees C. and 40 MHz frequency is 0.005 or more, and the dielectric welding film satisfies conditions (i) and (ii):
(i) a melting point or softening point measured in accordance with JIS K 7121 (1987) is in a range from 80 to 200 degrees C.; and
(ii) heat of fusion measured in accordance with JIS K 7121 (1987) is in a range from 1 to 80 J/g.

2. The dielectric welding film according to claim 1, wherein a content of the B component is in a range from 5 to 800 parts by mass with respect to 100 parts by mass of the A component.

3. A welding method using a dielectric welding film configured to weld a pair of adherends of the same material or different materials through dielectric heating, the dielectric welding film comprising a thermoplastic resin as an A component and a dielectric filler as a B component, wherein
the A component is at least one thermoplastic resin selected from the group consisting of a polyolefin resin, an olefin thermoplastic elastomer, a polyamide resin, a polyvinyl acetate resin, a polyacetal resin, and a polyester resin, wherein when the A component contains a polyolefin resin, the polyolefin resin is one of or a combination of resins selected from a homopolymer resin including polyethylene, polypropylene, polybutene and polymethylpentene, and a α-olefin resin of a copolymer of ethylene, propylene, butene, hexene, octene, and 4-methylpentene,
the B component is zinc oxide,
a mean particle size of the B component measured in accordance with JIS Z 8819-2 (2001) is in a range from 1 to 30 μm, and
the dielectric welding film satisfies conditions (i) to (iii):
(i) a melting point or softening point measured in accordance with JIS K 7121 (1987) is in a range from 80 to 200 degrees C.;
(ii) heat of fusion measured in accordance with JIS K 7121 (1987) is in a range from 1 to 80 J/g; and
(iii) a dielectric property (tan δ/ε') defined by dividing a dissipation factor tan δ of the dielectric welding film by a permittivity ε' of the dielectric welding film at 23 degrees C. and 40 MHz frequency is 0.005 or more, the method comprising steps (1) and (2):
(1) holding the dielectric welding film between the pair of adherends; and
(2) applying the dielectric heating on the dielectric welding film held between the pair of adherends with a dielectric heater by applying a high-frequency wave of 1 to 100 MHz frequency.

4. The welding method according to claim 3, wherein in the step (2), the high-frequency wave is applied at a high-frequency output ranging from 0.1 to 20 kW and a high-frequency-wave application time of 1 second or more and less than 40 seconds.

5. The welding method according to claim 3, wherein a content of the B component is in a range from 5 to 800 parts by mass with respect to 100 parts by mass of a content of the A component.

\* \* \* \* \*